United States Patent [19]

Ichimura et al.

[11] Patent Number: 4,942,292

[45] Date of Patent: Jul. 17, 1990

[54] APPARATUS FOR FOLLOWING SUN LIGHT

[75] Inventors: Kiyoshi Ichimura, Tokyo; Kideaki Ito, Tokyo; Masaki Fuse, Tokyo; Chiaki Suematsu, Tokyo; Shingo Suzuki, Zama; Satoshi Takahashi, Tokyo, all of Japan

[73] Assignee: Mitsubishi Rayon Co., Ltd., Tokyo, Japan

[21] Appl. No.: 206,831

[22] Filed: Jun. 9, 1988

[30] Foreign Application Priority Data

Jun. 11, 1987 [JP] Japan .................................. 62-146025

[51] Int. Cl.[5] .............................................. G01J 1/20
[52] U.S. Cl. .................................. 250/203.4; 126/425
[58] Field of Search ........................ 250/203 R, 203 S; 126/424, 425

[56] References Cited

U.S. PATENT DOCUMENTS

| | | | |
|---|---|---|---|
| 4,107,521 | 8/1978 | Winders | 250/203 S |
| 4,290,411 | 9/1981 | Russell | 250/203 R |
| 4,447,718 | 5/1984 | Mori | 126/425 |
| 4,740,682 | 4/1988 | Frankel | 250/203 R |

FOREIGN PATENT DOCUMENTS

| | | |
|---|---|---|
| 0050189 | 4/1982 | European Pat. Off. . |
| 0069891 | 1/1983 | European Pat. Off. . |
| 0100124 | 2/1984 | European Pat. Off. . |
| 2711570 | 9/1978 | Fed. Rep. of Germany . |
| 61-137103 | 6/1986 | Japan . |

Primary Examiner—David C. Nelms
Attorney, Agent, or Firm—Lowe, Price, LeBlanc, Becker & Shur

[57] ABSTRACT

In apparatus for following sun light, at least two pairs of diametrically facing light-receiving elements (30a, 30c and 30b, 30d) are provided along the periphery of a circular end plane of incidence (24) of an optical fiber cable (20) where sun light is condensed by way of a lens 14. The deviation of a condensed light area from the circular end plane of incidence (24) will be effectively detected by the light-receiving elements to control a drive unit (46) which drives an equatorial (18) carrying an optical system including the lens (14) and the end plane of incidence (24) of the optical fiber cable (20). In one embodiment, another light-receiving element (50i) is provided at the center of the end plane of incidence (24) to detect when light condensing area is deviated to a great extent. The output signal of this light-receiving element (50i) is used to perform speed control of the drive unit (46). In another embodiment, a circuit arrangement for detecting abnormal state of the optical system is also used.

9 Claims, 5 Drawing Sheets

APPARATUS FOR FOLLOWING SUN LIGHT

BACKGROUND OF THE INVENTION

1. Field of the Invention

This invention relates generally to apparatus for following sun light, and particularly to such apparatus which is used with sun light collecting apparatus arranged to condense sun light and to send condensed sun light to a place where sun light is needed via an optical fiber cable.

2. Description of the Prior Art

Various apparatus for following sun light have been known. In such known apparatus, one apparatus is arranged to sense sun light, one being arranged to perform numerical control through computation of the orbital pass of the sun, one being arranged to move a focal point portion (in the case of a parabolic mirror), and one being arranged to utilize a fixed device which is inclined in a manner of south side down and north side up. On the other hand, as sun light condensing apparatus there is one which condenses sun light using a Fresnel lens by automatically changing its angle to face the sun, thereby sending condensed sun light via an optical fiber cable to a place where sun light is needed. As an example of such an apparatus, there is sun light automatic condensing and transmission apparatus known as "HIMAWARI" produced by La Foret Engineering Co. Ltd. When using a Fresnel lens for condensing sun light, a slight difference in angle of several degrees or less between sun light and the axis of the Fresnel lens results in serious difficulty in sun light condensing. Therefore, apparatus for following sun light of high precision is required. In addition, axis deviation or misalignment may occur due to electrical or mechanical error even though an equatorial movement is controlled in accordance with orbital computation. For such reason, a method which combines sun light sensing and numerical control through orbital computation is generally adopted.

A known sun light sensing apparatus is disclosed in Japanese Patent provisional publication 59-15809. According to a technique disclosed in this publication a casing provided separately from a Fresnel lens is accurately directed to the sun, and a plurality of photosensors are provided within the casing to detect the difference in intensity of light thereby correcting axis deviation.

The above-mentioned conventional apparatus has the following problems since a sun light sensor is located at a place remote from a light-condensing portion where a Fresnel lens and an end plane of incidence of an optical fiber cable are located:

(1) A high precision in mounting the apparatus is required for determining the position and direction of the sun light sensor in accordance with the position and direction of a Fresnel lens.

(2) Diffused light which cannot be used by the sun light condensing apparatus gives undesirable influences to the sun light sensor.

SUMMARY OF THE INVENTION

The present invention has been developed in order to remove the above-described drawbacks inherent in the conventional apparatus for following sun light.

It is, therefore, an object of the present invention to provide new and useful apparatus for following sun light which is capable of providing a high accuracy in tracking operation at a low cost.

According to a feature of the present invention at least two pairs of light-receiving means are provided at opposite positions along the periphery of an end plane of incidence of an optical fiber, i.e. a circular portion where sun light is to be condensed by a lens, to produce a control signal when one of the two output signals of one pair of light-receiving means indicates the incidence of sun light, thereby correcting the tracking or following direction.

According to another feature of the present invention another light-receiving means is also provided within the circular portion where sun light is to be condensed, and it is arranged to control the moving speed of the equatorial depending on whether sun light is detected by this light-receiving means.

According to a further feature of the present invention, means for receiving sun light by a path external to an optical system of sun light condensing apparatus and means for receiving sun light through the optical system are provided in addition to the structure of the first embodiment to detect abnormal condition of the optical system.

Thus, in accordance with the first embodiment of the present invention there is provided apparatus for following sun light for use with sun light condensing apparatus with a lens, said apparatus for following sun light being arranged to perform normal tracking in accordance with data including longitude and latitude of a place where said sun light condensing apparatus is mounted, number of days after vernal equinox and time, characterized by at least two pairs of light-receiving means each provided at opposite positions along the periphery of a circular portion where said sun light is to be condensed, a signal processing circuit responsive to output signals from said light-receiving means for producing a control signal when one of a pair of output signals indicates incidence of sun light, and means for interrupting said normal tracking in the presence of said control signal and for moving said sun light condensing apparatus in a direction from one of a pair of said light-receiving means, causing generation of said control signal, and which one is not receiving sun light toward the other light-receiving means which is actually receiving sun light.

Similarly, in accordance with the second embodiment of the present invention there is provided apparatus for following sun light for use with sun light condensing apparatus with a lens, said apparatus for following sun light being arranged to perform normal tracking in accordance with data including longitude and latitude of a place where said sun light condensing apparatus is mounted, number of days after vernal equinox and time, characterized by at least two pairs of light-receiving means each provided at opposite positions along the periphery of a circular portion where said sun light is to be condensed, a signal processing circuit responsive to output signals from said light-receiving means for producing a control signal when one of a pair of output signals indicates incidence of sun light, means for interrupting said normal tracking in the presence of said control signal and for moving said sun light condensing apparatus in a direction from one of a pair of said light-receiving means causing generation of said control signal, and which one is not receiving sun light toward the other light-receiving means which is actually receiving sun light, additional light-receiving means provided within said circular portion where sun light is to be condensed, and speed controlling means for controlling the speed of said means for moving in accordance with an output from said additional light-receiving means.

Furthermore, in accordance with the third embodiment of the present invention there is provided apparatus for following sun light for use with sun light condensing apparatus with a lens, said apparatus for following sun light being arranged to perform normal tracking in accordance with data including longitude and latitude of a place where said sun light condensing apparatus is mounted, number of days after vernal equinox and time, characterized by at least two pairs of light-receiving means each provided at opposite positions along the periphery of a circular portion where said sun light is to be condensed, a signal processing circuit responsive to output signals from said light-receiving means for producing a control signal when one of a pair of output signals indicates incidence of sun light, means for interrupting said normal tracking in the presence of said control signal and for moving said sun light condensing apparatus in a direction from one of a pair of said light-receiving means, causing generation of said control signal, and which one is not receiving sun light toward the other light-receiving means which is actually receiving sun light, external light-receiving means arranged to receive sun light not via an optical system of said sun light condensing light apparatus, internal light-receiving means provided within said circular portion where sun light is to be condensed, and means for responsive to output signals from said external light-receiving means and internal light-receiving means for producing an alarm signal only when an output signal from said external light-receiving means is outputted and an output signal from said internal light-receiving means is present for a predetermined period of time.

In the first embodiment when only one of the two opposite light-receiving means senses sun light, a control signal is produced to interrupt normal tracking operation and to move the light-condensing apparatus in a given direction. Thus, in the case a portion where light is condensed by a lens protrudes beyond an end plane of incidence of an optical fiber cable, light-receiving means located at a place of such protrusion detects this to perform position control in a direction of correcting the protrusion. Furthermore, in an abnormal case in which the light-condensing portion protrudes into two opposite portions of the end plane of incidence of the fiber cable, it cannot be determined in which direction position correction is to be made, and therefore no position correction is made.

According to the second embodiment since light-receiving means is also provided within the end plane of incidence of an optical fiber cable to detect sun light by the light-receiving means, thereby to control the moving speed of the equatorial, the moving speed of the equatorial may be selected for correcting the deviation of sun light condensing area from the end plane of incidence depending on the degree of such deviation.

According to the third embodiment, sun light not passed through an optical system made of a filter and a lens of light condensing apparatus and sun light passed through the optical system are respectively detected, and therefore an abnormal condition of the optical system may be detected to produce an alarm signal. Furthermore, according to the third embodiment by utilizing light-receiving means provided to the end plane of incidence as it is, the constituting elements of the second embodiment can be applied as they are.

BRIEF DESCRIPTION OF THE DRAWINGS

These and other objects and features will become more readily apparent from the following detailed description of the preferred embodiments taken in conjunction with the accompanying drawings in which.

In the drawings, the same or corresponding elements are designated at like numerals.

DETAILED DESCRIPTION OF THE INVENTION

Figure 1:
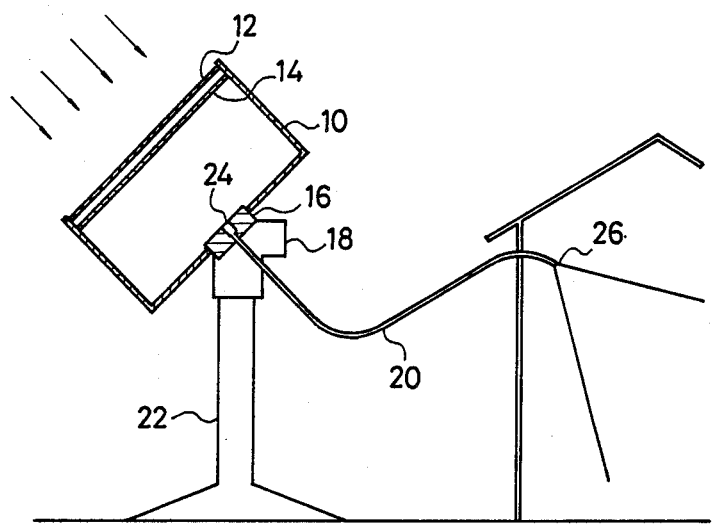
FIG. 1 is a schematic structural view of apparatus for taking sun light utilizing sun light condensing apparatus having a first embodiment of the apparatus for following sun light according to the present invention.

Reference is now made to FIG. 1. which shows apparatus for taking sun light in which a first embodiment of the apparatus for following sun light according to the present invention is incorporated. More specifically, the apparatus for taking sun light comprises sun light following apparatus 18, an equatorial 16, light-condensing portion casing 10, and light-taking optical fiber cable 20 all mounted on a base 22. Sun light is condensed by a Fresnel lens 14 to be incident on an end plane of incidence 24 of the optical fiber cable 20 with its infrared rays being cut by a filter 12 attached to a front portion of the light-condensing portion casing 10. In order to track sun light, the equatorial 16 and sun light following apparatus 18 according to the present invention are provided.

The Fresnel lens 14 is made of transparent PMMA (polymethylmethacrylate), and has radius of 150 mm and focal length of 412 mm. As the optical fiber cable 20 is used a plastic optical fiber made by Mitsubishi Rayon Co., Ltd. named "Eska" (trademark). The angle of view (40°) of the Fresnel lens 14 is made smaller than the opening angle (60°) of "Eska". The radius of the sun is $6.95 \times 10^5$ km, and the distance to the earth is $1.5 \times 10^8$ km. Due to elliptical orbit the visual angle has slight variation and is approximately 32 minutes, Therefore, when the focal point of the Fresnel lens 14 is placed on the end plane of incidence 24 of the optical fiber cable 20, the diameter of a resulted image of the sun is 3.8 mm. Actually, a condensing area 36 is slightly larger than the above due to an unsharpened image caused from aberration of the Fresnel lens 14. An optical fiber cable 20 is used one having a diameter of 7.5 mm, where this cable is made with a tube being tightly filled with 39 Eskas each having a diameter of 1 mm.

The sun light following apparatus 18 performs position control normally to follow moving incident sun light in accordance with the following equations:

For the direction of declination:
$$\delta = 23.5° \times \sin(2\pi T/365) + 54.5 \quad (1)$$

wherein $\delta$ is declination of the sun; and

T is the number of days counted from vernal equinox

Therefore, the movement of the sun from winter solstice to summer solstice in terms of angle is 47°.

For the direction of right ascension:
$$H = 15° \times (t - 12 + p / 15 + e) \quad (2)$$

wherein

H is right ascension of the sun;

t is time;

p is (longitude of the mounting point−longitude of standard time (135° E); and e is equation of time (+16.4 14.3m)

Thus, the sun moves 360° a day, i.e. 15° an hour, and the equatorial 16 is moved in units of 0.76 second.

The accuracy of polar axis setting of the equatorial 16 is within 3 minutes, the light-guidance error of the sun light following apparatus 18 during operation is approximately 20 minutes, and since the frequency of a crystal oscillator used for generating a basic clock of a timer of the sun light following apparatus 18 is calibrated to 5 digits, the overall accuracy is within 26 seconds per month (i.e. 6.5 minutes in terms of right ascension per month).

Figure 2:
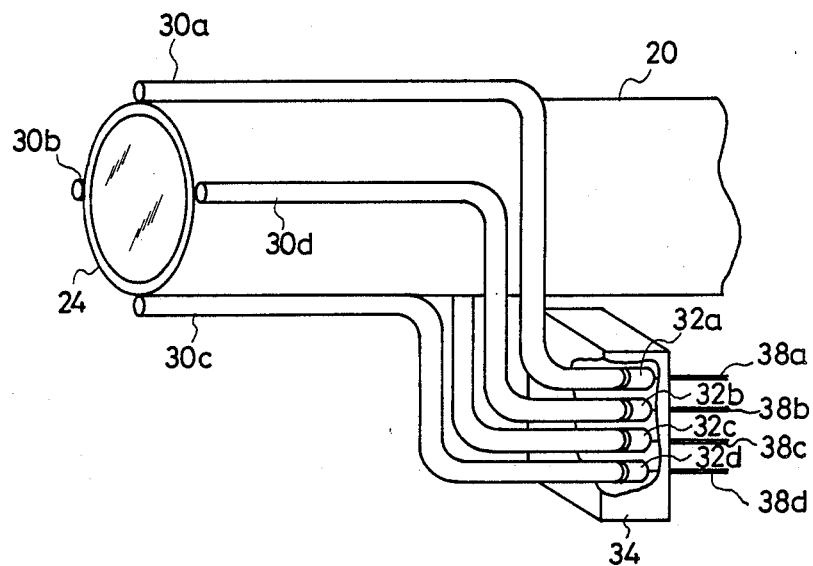
FIG. 2 is a diagram showing the arrangement of a plurality of optical fibers for detecting sun light which are arranged along the periphery of a light condensing portion within the apparatus of FIG. 1, and light-receiving elements responsive to optical signals sent via the optical fibers.

FIG. 2 shows an arrangement of light-receiving means used for apparatus for following sun light according to the present invention. Around the end plane of incidence 24 of the optical fiber cable 20 are arranged one ends of four optical fibers 30a, 30b, 30c and 30d equidistantly, such that 30a and 30c diametrically face each other and 30b and 30d diametrically face each other. The other ends of these optical fibers 30a to 30d are connected to light-receiving elements 32a, 32b, 32c and 32d such as photodiodes to detect deviation in light condensation at the periphery of the end plane of incidence 24 of the optical fiber cable 20. A member 34 is used to fix; the light-receiving elements 32a to 32d, and is attached at an appropriate position within the equatorial 16 or the sun light following apparatus 18 of FIG. 1.

Figure 3:
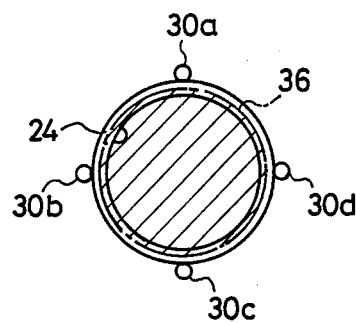
FIGS. 3 and 4 are diagrams showing the positional relationship between end plane of incidence of FIG. 2 and condensed sun light.
Figure 4:
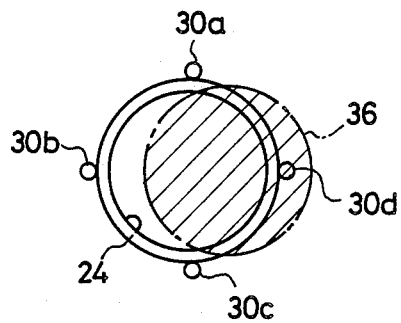

FIGS. 3 and 4 are top plan views of the end plane of incidence 24 of the optical fiber cable 20 of FIG. 2. The end plane of incidence 24 of the optical fiber cable 20 is circular, and during normal tracking operation sun light is condensed to be applied to the entire area of the circular end plane of incidence 24 by way of the Fresnel lens 14 as shown by a hatched area in FIG. 3. At this time, none of the optical fibers 30a to 30d receives sun light. In FIG. 3, the direction from 30b to 30d is the direction of right ascension and the direction from 30a to 30d is the direction of declination. On the other hand, when axis deviation occurs due to some reason, such as an electrical or mechanical error during normal tracking operation based on the formulas (1) and (2), correction is then required.

FIG. 4 shows a state where condensed sun light is applied beyond the circular portion of the end plane of incidence 24 to protrude to a side of the optical fiber 30d. In this case, only the light-receiving element 30d detects sun light to produce an output signal.

Figure 5:
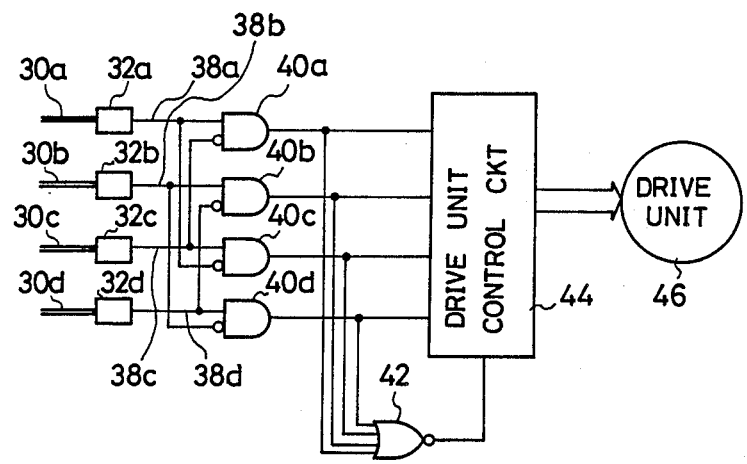
FIG. 5 is a diagram showing a control signal producing circuit to which output signals from light-receiving elements of FIG. 2 are inputted, and a drive unit which performs position control of the equatorial shown in FIG. 1.

FIG. 5 shows a diagram of a circuit which generates a control signal by processing output signals from the light-receiving elements 32a to 32d. The references 38a to 38d are lead wires of the light-receiving elements 32a to 32d. The references 40a to 40d are AND gates whose one input terminal is an inverted input, and each of them is responsive to electrical signals from each pair of light-receiving elements 32a to 32d responsive to optical signals from each pair of diametrically opposite optical fibers 30a to 30d. The reference 42 is a NOR gate which is responsive to an output signal from output signals from the AND gates 40a to 40d. Under the light condensing state of FIG. 4, only the light-receiving element 32d responsive to the optical fiber 30d senses the incident light, whereas others do not sense the incident light, and thus only the AND gate 40d produces logic "1". In response to the signal of logic "1" the NOR gate 42 outputs logic "0". Outputs of the respective AND gates 40a to 40d and the NOR gate 42 are inputted to a drive unit control circuit 44. An output signal from the drive unit control circuit 44 is connected to a drive unit 46 which performs direction control of the equatorial 16 in accordance with output signals from the drive unit control circuit 44. When logic "1" output from the NOR gate 42 turns to logic "0", normal tracking operation performed till this time in accordance with the formulas (1) and (2) is interrupted, and is switched to position control on the basis of the output signals from the AND gates 40a to 40d. More specifically, the drive unit control circuit 44 includes a switching circuit (not shown) responsive to the output signal from the NOR gate 42, and in the presence of logic "0" signal from the NOR gate 42, the drive unit control circuit 44 is becomes responsive to the output signals from the AND gates 40a to 40d.

The relationship between the state of sun light incident on respective optical fibers 30a to 30d and the control direction of the equatorial 16 is shown in the following table. In this table, the reference ON indicates sun light incidence and the reference OFF indicates the absence of sun light incidence. Arrows in the column of control direction of the equatorial 16 indicates various directions, i.e. right, left, up and down in FIG. 3. When the incident light is not applied to any of the optical fibers 30a to 30d, i.e. in OFF state, the NOR gate 42 produces logic "1" to restore normal tracking operation.

| MODE No. | STATE OF LIGHT INCIDENT ON OPTICAL FIBERS | | | | CONTROL DIRECTION OF EQUATORIAL |
|---|---|---|---|---|---|
| | 30a | 30b | 30c | 30d | |
| 1 | ON | | OFF | | ↑ |
| 2 | OFF | | ON | | ↓ |
| 3 | | ON | | OFF | ← |
| 4 | | OFF | | ON | → |
| 5 | OFF | OFF | OFF | OFF | NORMAL TRACKING |

Although four optical fibers 30a to 30d are used in the present embodiment such that two pairs of light-receiving means are arranged along the periphery of the end plane of incidence 24 with an interval of 90°, the number of pairs of light-receiving means may be any number as long as it is 2 or more.

Figure 6:
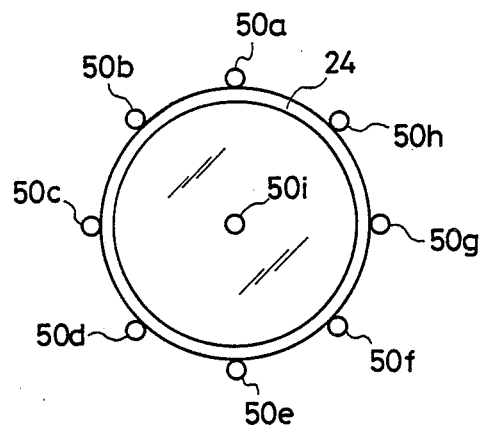
FIG. 6 is a diagram showing an end plane of incidence of the optical fiber in a second embodiment of the apparatus for following sun light according to the present invention.

FIG. 6 shows a second embodiment of the present invention in which four pairs of light-receiving means, i.e. eight optical fibers 50a to 50h are arranged along the periphery of the end plane of incidence 24. Respective optical fibers 50a to 50h are respectively connected to corresponding light-receiving elements 52a to 52h in the same manner as shown in FIG. 2, where output signals from the light-receiving elements 52a to 52h are fed to a signal processing circuit of FIG. 7.

Figure 7:
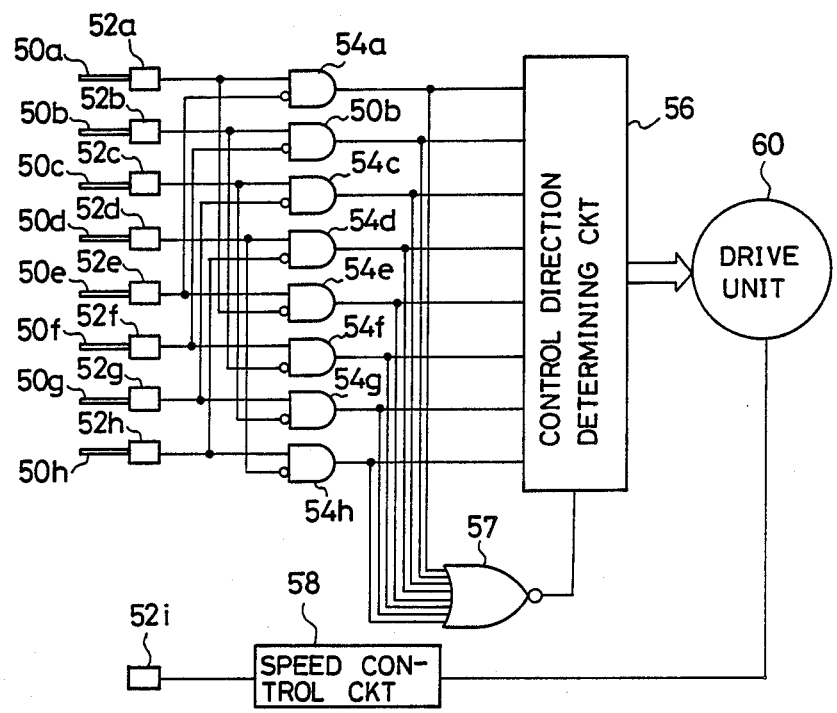
FIG. 7 is a diagram showing light-receiving elements responsive to optical signals from respective optical fibers shown in FIG. 6, signal processing circuit and speed control circuit both connected thereto, and drive unit which performs position control of the equatorial.

The signal processing circuit illustrated in FIG. 7 includes AND gates 54a to 54h each having an inverted input terminal, a control direction determining circuit 56 and and a NOR 57 gate both receiving output signals from the AND gates 54a to 54h. The control direction determining circuit 56 is used to determine the direction of the movement of the equatorial 16 performed by a drive unit 60 on the basis of the output signals from the AND gates 54a to 54h. More specifically, control direction of the equatorial 16 is determined by which optical fiber or fibers is/are receiving incident sun light. In the case two or more optical fibers detect incidence of sun light, the control direction is selected to be a middle of end planes of incidence of such plural optical fibers. In order to determine the control direction, a memory map may be used.

The NOR gate 57 is arranged to produce an output signal for interrupting and restarting normal tracking operation in the same manner as in the first embodiment of FIG. 5. In the second embodiment of FIGS. 6 and 7, not only the number of pairs of light-receiving means has been increased compared to the first embodiment of FIGS. 2 to 5, but also additional light-receiving means 50i has been provided within the end plane of incidence 24. The additional light-receiving means 50i is an optical fiber like other light-receiving means 50a to 50h, and is connected to a corresponding light-receiving element 52i. An output signal from the light-receiving element 52i is inputted to a speed control circuit 58.

Figure 8:
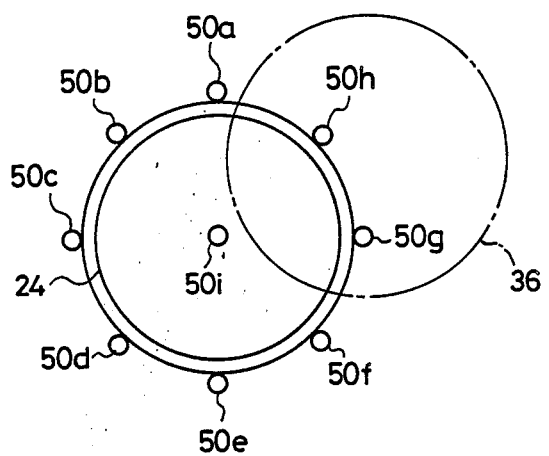
FIGS. 8 and 9 are diagrams showing positional relationship between end plane of incidence and sun light in the second embodiment.
Figure 9:
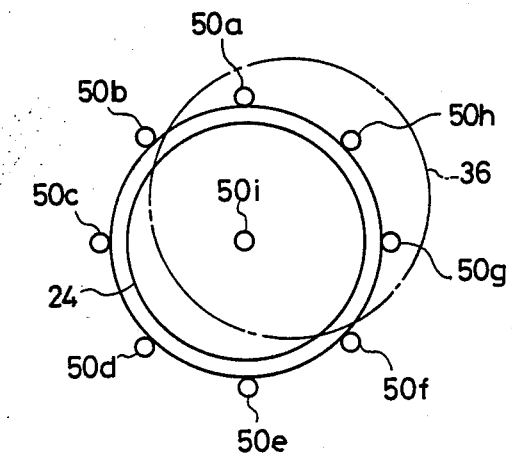

The speed control circuit 58 is arranged to produce a speed control signal which causes the drive unit 60 to operate at a high speed when the light-receiving element 52i does not detect sun light, and to operate at a low speed when sun light is detected. More specifically, as shown in FIG. 8 when an irradiated portion 36 as a result of sun light condensation deviates to one side so that the center of the end plane of incidence 24 is not irradiated, the equatorial 16 is moved at a high speed. Then as shown in FIG. 9, when the irradiated portion 36 is moved to include the center portion, then the moving speed of the equatorial 16 is reduced. With such speed control, position control of the equatorial 16 is effected within a short period of time and also the occurrence of hunting is effectively prevented.

Figure 10:
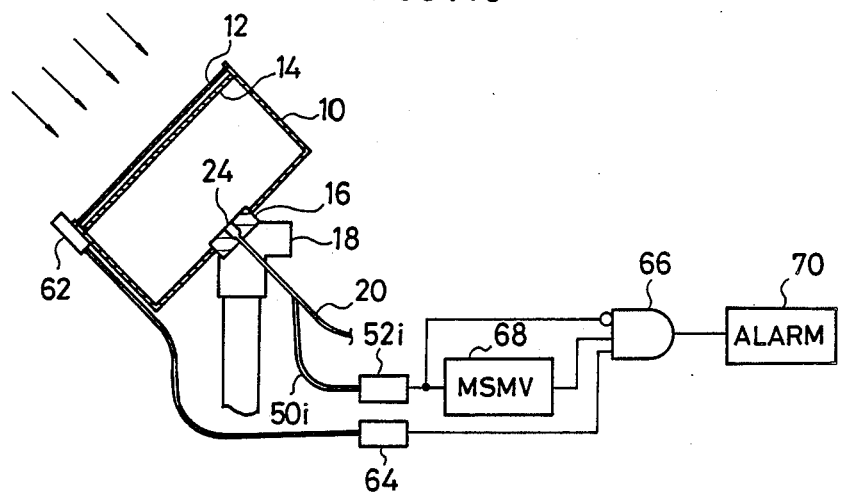
FIG. 10 is a diagram showing a third embodiment of the apparatus for following sun light according to the present invention.

FIG. 10 shows a third embodiment which includes a circuit arrangement for detecting abnormal condition of the optical system of the sun light condensing apparatus. This embodiment also comprises an optical fiber 50i for detecting irradiating condition at the center of the end plane of incidence 24 in the same manner as in the second embodiment of FIGS. 6 and 7. In addition, another optical fiber 62 is provided at place where sun light is applied without passing through the filter 12 and the Fresnel lens 14 which constitute the optical system of the sun light condensing apparatus, and a light-receiving element 64 responsive to the optical fiber 62 is provided. An abnormal condition of the optical system is determined on the basis of output signals from the light-receiving elements 52i and 64 to output an alarm such as a buzzer signal. In the circuit of FIG. 10, the output signal from the light-receiving element 52 is applied to an input of a monostable multivibrator (MSMV) 68 and to an inverted input of an AND gate 66. The monostable multivibrator 66 is arranged to cause its output logic level to be zero for a predetermined period of time when triggered by a rising edge (trailing edge) of the output signal from the light-receiving element 52i. This predetermined period of time is set to a period of time (for instance 10 seconds) which is longer than a maximum period of time normally required until the irradiated portion 36 which is deviated from the end plane of incidence 24 is moved to be completely within the end plane of incidence 24 through position control of the equatorial 16. The output signal from the monostable multivibrator 68 is applied to an input of the AND gate 66. An output signal from the light-receiving element 64 is also applied to the AND gate 66. The output signal from the AND gate 66 is fed to an alarm 70. Any alarm device which emits sound like a buzzer or a bell or which flashes a lamp or the like may be used as this alarm 70.

Figure 11:
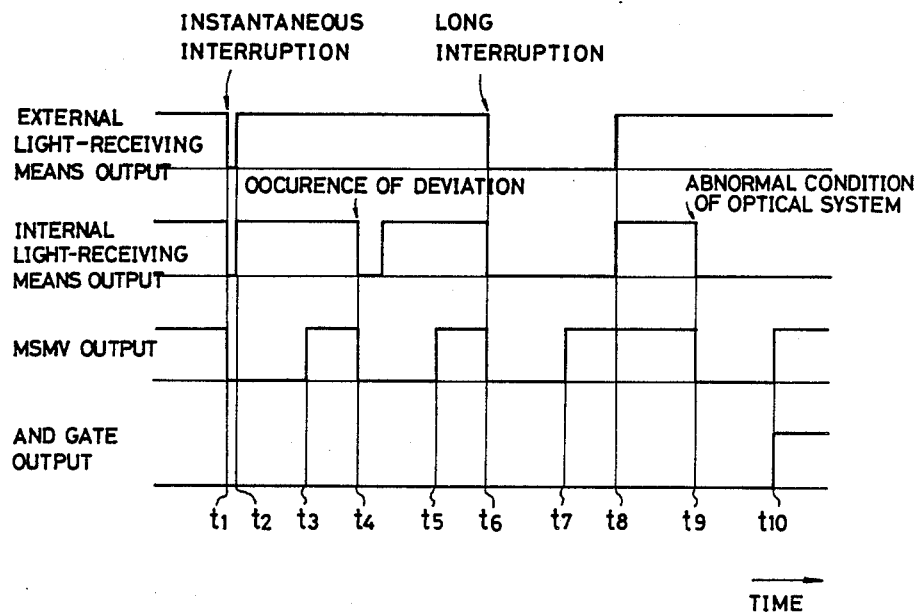
FIG. 11 is a timing chart showing the operation of the circuit arrangement of FIG. 10.

The combination of the optical fiber 62 which directly receives sun light and light-receiving element 64 is referred to as external light-receiving means, and the combination of the optical fiber 50i provided within the end plane of incidence 24 and light-receiving element 52i is referred to as internal light-receiving means. The relationship between sun light detecting condition by the external light-receiving means and by the internal light-receiving means, the output signal from the monostable multivibrator 68, and the output signal from the AND gate 66 is shown in FIG. 11. Let us assume that sun light incidence on the sun light condensing apparatus is interrupted at time t1 for a short period of time (till t2) by clouds, birds or the like. Both the external light-receiving means and the internal light-receiving means detect this interruption and thus the monostable multivibrator 68 produces a signal of logic "0" till time t3. Therefore, the output signal of the AND gate 66 is kept logic "0" even after time t3 and no alarm is issued. Let us suppose that an error occurs in the normal tracking operation of the equatorial 16 and as a result, the internal light-receiving means does not detect sun light incidence at time t4. While the monostable multivibrator 68 produces a signal of logic "0" till time t5 being triggered, the output of the AND gate 66 is continuously kept logic "0" even thereafter, and therefore no alarm is issued.

Suppose incidence of sun light is interrupted for a long period of time from time t6 to time t8 by clouds or the like. In this case, although the output of the monostable multivibrator 68 turns to logic "1" at time t7, the output of the AND gate 66 is maintained logic "0" because the external light-receiving means does not detect sun light even thereafter. As a result, no alarm is issued. Let us suppose that serious abnormality, such as breakage, warping or the like, has occurred in the filter 12, the Fresnel lens 14 or the like of FIG. 1. Since sun light condensation and application of the same to the end plane of incidence 24 is interrupted for a long period of time, the output of the AND gate 66 turns to logic "1" at time t10 and thus the alarm 70 is driven.

By using the circuit arrangement of FIG. 10, an alarm is issued only when abnormal condition occurs in the optical system through detection of the same. Therefore, this embodiment is advantageous in connection with maintenance of the sun light condensing apparatus. Furthermore, the circuit arrangement of FIG. 10 may be provided with the circuit arrangement for speed control shown in FIG. 7, and in such a case, the optical fiber 50i and the light-receiving element 52i may respectively be used in common to both circuit arrangements.

The apparatus for following sun light according to the present invention described in detail in the above have the following advantages. First of all, since plural pairs of light-receiving means for detecting tracking error, i.e. axis deviation, are arranged along the periphery of the circular portion where sun light is to be condensed, high accuracy in mounting position and direction of each light-receiving means is not required to be as high as conventional system. Furthermore, since sun light is detected after being condensed by a Fresnel lens of sun light condensing apparatus, there is no undesirable influence by diffused light as in the conventional apparatus. Furthermore, in the second embodiment of the present invention, in addition to the above features since the degree of axis deviation is detected to control the moving speed of the equatorial driven by the drive unit, axis deviation can be corrected within a short period of time, while hunting is effectively prevented. Furthermore, in the third embodiment of the present invention, in addition to the features of the first embodiment since abnormal condition of the optical system is detected to issue an alarm, the apparatus is advantageous in view of maintenance. Especially, the third embodiment is advantageous because light-receiving means provided within the end plane of sun light incidence which is used in the second embodiment can be used in common as sun light detecting means for detecting such abnormal condition.

The above-described embodiments are just examples of the present invention, and therefore, it will be apparent for those skilled in the art that many modifications and variations may be made without departing from the scope of the present invention.

What is claimed is:

1. Apparatus for following sun light for use with sun light condensing apparatus with a lens and a plurality of light-collecting optical fibers whose one ends are arranged within a circular area where said sun light is intended to be condensed by said lens, said apparatus comprising:
   (a) means for performing normal tracking in accordance with data including longitude and latitude of a place where said sun light condensing apparatus is mounted, number of days after vernal equniox and time;
   (b) at least two pairs of light-receiving means each provided at opposite positions along the periphery of said circular area in which said light-collecting optical fibers are arranged, each of said light-receiving means including an optical fiber having an end at a position immediately outside said circular area;
   (c) a signal processing circuit responsive to output signals from said light-receiving means for producing a control signal when one of a said light receiving means senses incidence of sun light; and
   (d) means for interrupting said normal tracking in the presence of said control signal and for moving said sun light condensing apparatus in a direction for one of a pair of said light-receiving means causing generation of said control signal which said one of said pair of said light-receiving means is not receiving sun light toward the other light-receiving means of said pair of light receiving means which is actually receiving sun light.

2. Apparatus for following sun light as claimed in claim 1, wherein each said optical fiber of said light-receiving means arranged along the periphery of said circular area where sun light is to be condensed, is arranged in an optical fiber cable.

3. Apparatus for following sun light as claimed in claim 1, wherein said signal processing circuit comprises gate circuits responsive to said two opposite light-receiving means, where the number of said gate circuits is equal to the number of said light-receiving means.

4. Apparatus for following sun light as claimed in claim 3, wherein said means for interrupting and moving is arranged to interrupt and restart said normal tracking in response to an output signal from another gate circuit which is responsive to all output signals from said gate circuits.

5. Apparatus for following sun light for use with sun light condensing apparatus with a lens and a plurality of light-collecting optical fibers whose one ends are arranged within a circular area where said sun light is intended to be condensed by said lens, said apparatus comprising:
   (a) means for performing normal tracking in accordance with data including longitude and latitude of a place where said sun light condensing apparatus is mounted, number of days after vernal equinox and time;
   (b) at least two pairs of light-receiving means each provided at opposite positions along the periphery of said circular area in which said light-collecting optical fibers are arranged, each of said light-receiving means including an optical fiber having an end at a portion immediately outside said circular area;
   (c) a signal processing circuit responsive to output signals from said light-receiving means for producing a control signal when one of a said light-receiving means senses incidence of sun light;
   (d) means for interrupting said normal tracking in the presence of said control signal and for moving said sun light condensing apparatus in a direction from one of a pair of said light-receiving means causing generation of said control signal, which said one of said pair of said light-receiving means is not receiving sun light toward the other one of said pair of said light-receiving means which is actually receiving sun light;
   (e) additional light-receiving means provided within said circular area where sun light is to be condensed; and
   (f) speed controlling means for controlling the speed of said means for moving in accordance with an output from said additional light-receiving means.

6. Apparatus for following sun light as claimed in claim 5, wherein said speed control means is arranged to cause said sun light condensing apparatus to move at a high speed when said light-receiving means provided within said circular area where sun light is to be condensed does not detect incidence of sun light, and to cause said sun light condensing apparatus to move at a low speed when said light-receiving means provided within said circular area where sun light is to be condensed detects incidence of sun light.

7. Apparatus for following sun light as claimed in claim 5, wherein said light-receiving means provided within said circular area is arranged to detect incidence of light at a substantially center portion of said circular area.

8. Apparatus for following sun light for use with sun light condensing apparatus with a lens and a plurality of light-collecting optical fibers whose one ends are arranged within a circular area where said sun light is intended to be condensed by said lens, said apparatus comprising:
  (a) means for performing normal tracking in accordance with data including longitude and latitude of a place where said sun light condensing apparatus is mounted, number of days after vernal equinox and time;
  (b) at least two pairs of light-receiving means each provided at opposite positions along the periphery of said circular area in which said light-collecting optical fibers are arranged, each of said light-receiving means including an optical fiber having an end at a position immediately outside said circular area;
  (c) a signal processing circuit responsive to output signals from said light-receiving means for producing a control signal when one of a said light-receiving means senses incidence of sun light; and
  (d) means for interrupting said normal tracking in the presence of said control signal and for moving said sun light condensing apparatus in a direction from one of a pair of said light-receiving means causing generation of said control signal, which said one of said pair of said light-receiving means is not receiving sun light toward the other one of said pair of said light-receiving means which is actually receiving sun light;
  (e) external light-receiving means arranged to receive sun light through a path external to said sun light condensing apparatus;
  (f) internal light-receiving means provided within said circular area where sun light is to be condensed; and
  (g) means responsive to output signals from said external light-receiving means and internal light-receiving means for producing an alarm signal only when an output signal from said external light-receiving means is outputted and an output signal from said internal light-receiving means is present for a predetermined period of time.

9. Apparatus for following sun light as claimed in claim 8, wherein said means for producing an alarm signal comprises a monostable multivibrator responsive to an output signal from said internal light-receiving means, a gate circuit responsive to respective output signals from said external light-receiving means, said internal light-receiving means and said monostable multivibrator, and an alarm arranged to be driven by an output signal from said gate circuit.

* * * * *

UNITED STATES PATENT AND TRADEMARK OFFICE
CERTIFICATE OF CORRECTION

PATENT NO. : 4,942,292
DATED : July 17, 1990
INVENTOR(S) : Kiyoshi ICHIMURA et al.

It is certified that error appears in the above-identified patent and that said Letters Patent is hereby corrected as shown below:

On the title page the second inventor should read as follows:

--Hideaki Ito--

Signed and Sealed this

Eighteenth Day of June, 1991

Attest:

Attesting Officer

HARRY F. MANBECK, JR.

Commissioner of Patents and Trademarks